Aug. 30, 1927.
J. M. HOWE
1,640,358
DUMPING MECHANISM FOR VEHICLES
Filed April 2, 1925  3 Sheets-Sheet 1
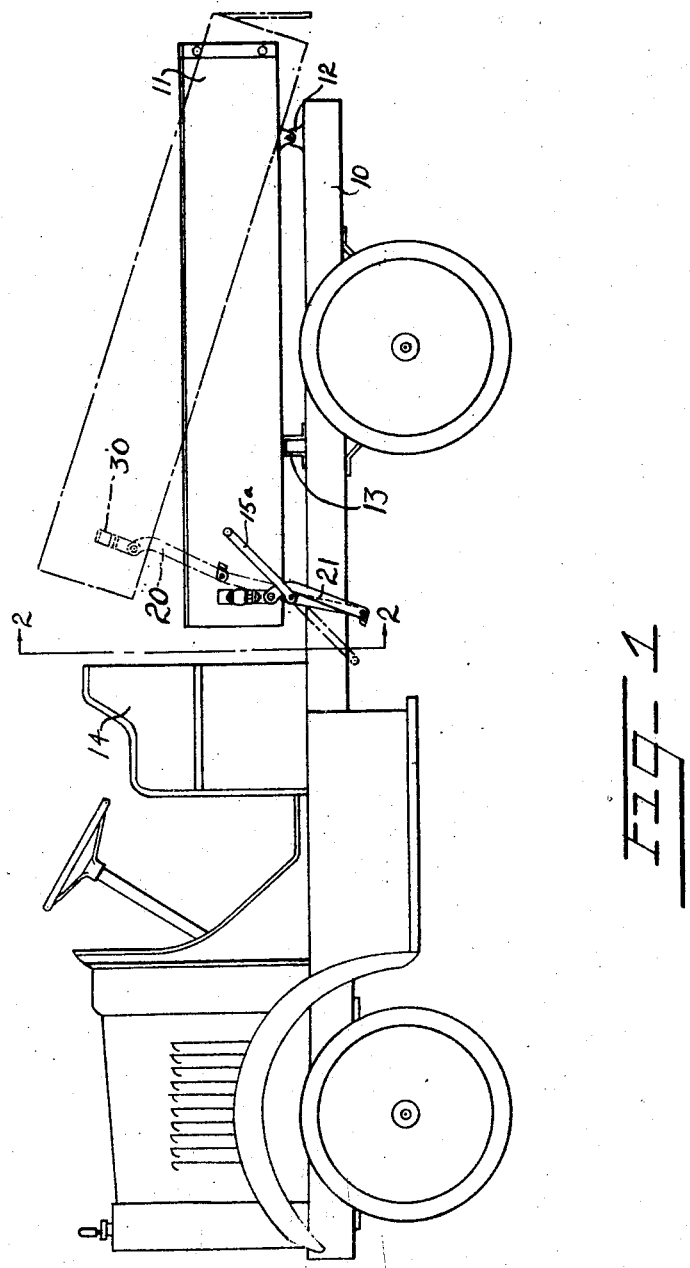
Inventor
James M. Howe
By Bates, Macklin, Goldrick & Teare
Attorneys

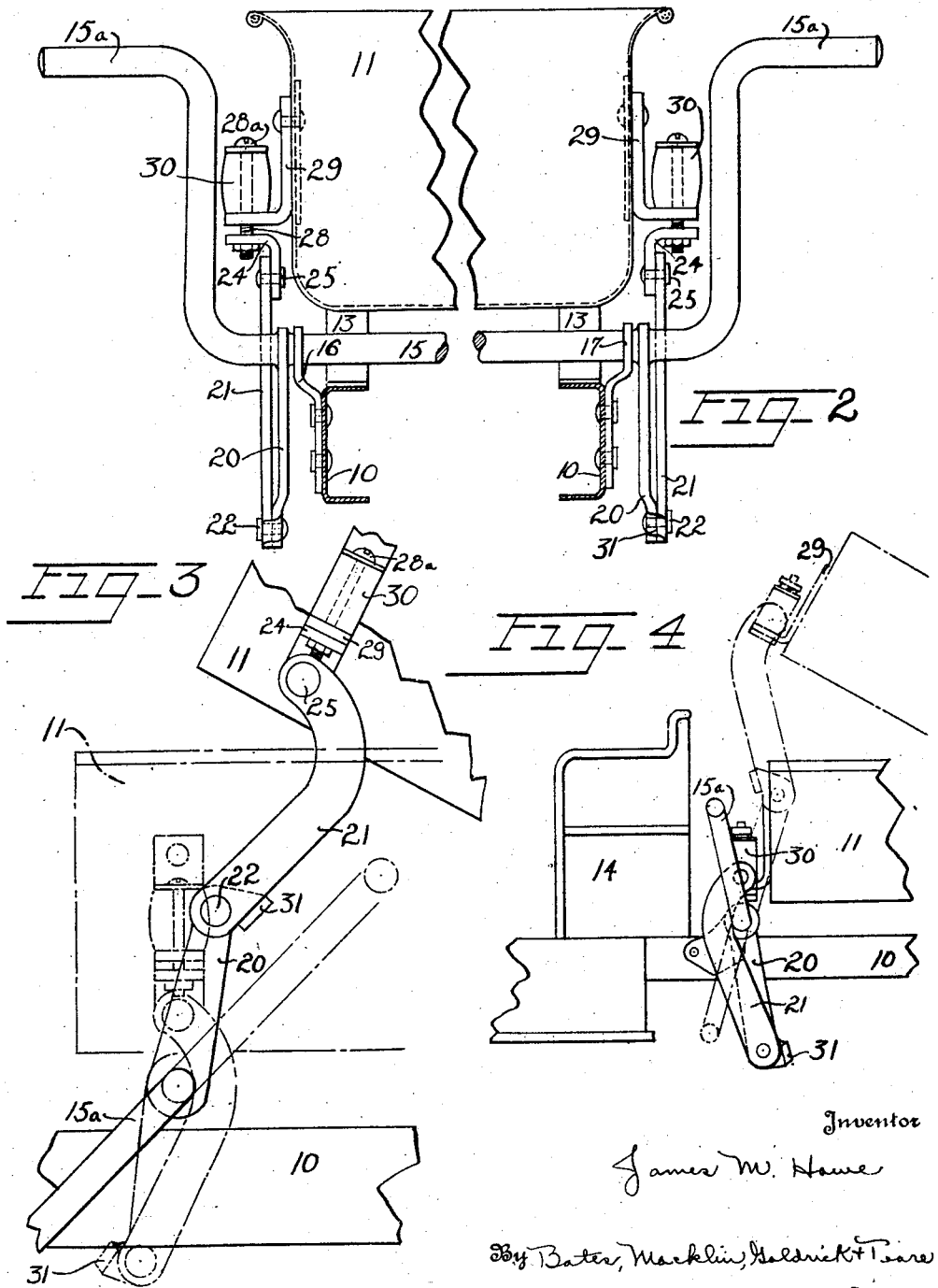

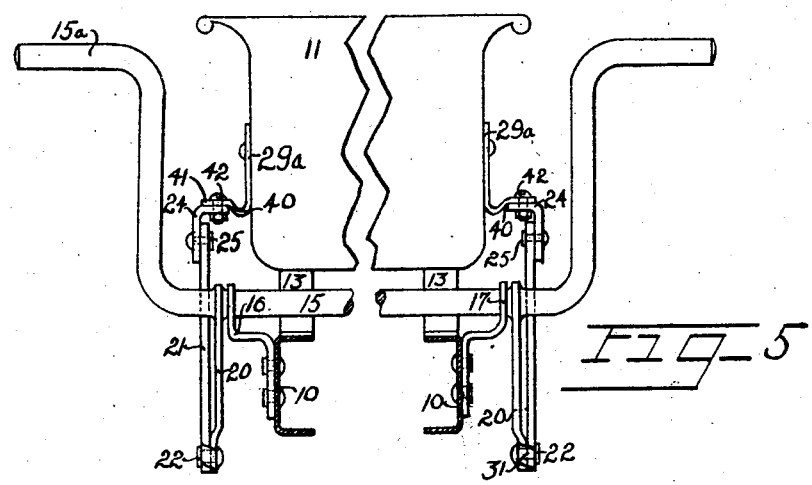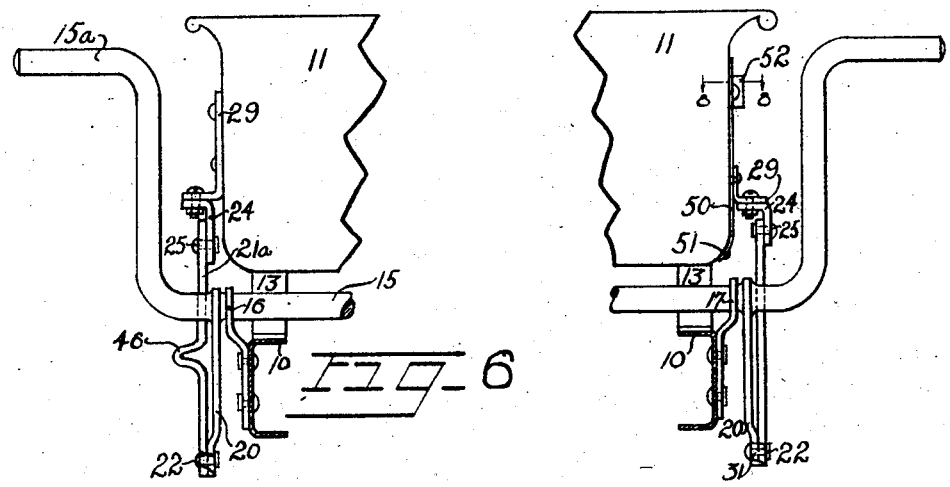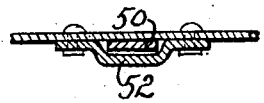

Patented Aug. 30, 1927.

1,640,358

UNITED STATES PATENT OFFICE.

JAMES M. HOWE, OF CLEVELAND HEIGHTS, OHIO, ASSIGNOR TO THE MURRAY PRODUCTS COMPANY, OF CLEVELAND, OHIO, A CORPORATION OF MICHIGAN.

DUMPING MECHANISM FOR VEHICLES.

Application filed April 2, 1925. Serial No. 20,073.

This invention is directed to improvements in dumping mechanisms for the bodies of vehicles and has for its general object a simple mechanism which may be operated to tilt a pivotally mounted body on the rear of a truck and which, when in a normal non-dumping position, may serve to lock the body in a load carrying position.

More specifically my invention is concerned with a dumping mechanism of the manually operated link motion type which may be serviceable to tilt load carrying bodies of light capacity and which includes a pivotal connection for the links of the mechanism which may be swung over a dead center position and thereby lock the body in a normally horizontal position.

Other objects of my invention will hereinafter become apparent in the following description referring to the accompanying drawings which illustrate a preferred form thereof. The essential characteristics are summarized in the claims.

In the drawings Fig. 1 is a side elevation of a truck equipped with a dumping mechanism embodying my invention; Fig. 2 is an enlarged cross-sectional view substantially along the plane 2—2 of Fig. 1 showing the dumping mechanism in a retracted or normal position; Fig. 3 is a fragmentary enlarged view of the link mechanism, showing, in full lines the mechanism extended to dumping position and in dot and dash lines to a normal position; Fig. 4 is a modified form of my invention with the mechanism shown in a normal position in full lines and in extended or dumping position in dot and dash lines; and Figs. 5 to 8 inclusive show modified forms of dumping mechanisms embodying my invention.

In the drawings Figs. 1 and 2, I show a truck having the chassis side bars 10 thereof surmounted by a body 11 pivotally connected to the chassis side bars adjacent the rear thereof as shown at 12. A pair of members 13 in the form of a body rest are mounted upon the chassis side bars intermediate the seat 14 of the truck and the rear end of the dump body. The dump mechanism is such that when the body 11 is lowered to a horizontal load carrying position the body will be resiliently urged to remain in contact with the members 13 thus preventing rattling of the body while the vehicle is moving.

As shown in Figs. 1 and 2, the dump mechanism may comprise a crank shaft 15 suitably mounted on bearing plates 16 and 17 which are preferably secured to the horizontal faces of the chassis members 10; a linkage arrangement comprising link arms 20 rigidly secured to the shaft adjacent the brackets 16 and 17 and offset swinging links 21, resiliently connected to the body. A crank arm 15$^a$ is shown as comprising an integral part of the shaft, but this arm may comprise a lever extending upwardly to a position adjacent the seat if desired.

The lower ends of the links 21 are pivotally connected to the link arms 20 by pins 22 and the upper ends of the links are pivotally connected to L-shaped members 24 by pins 25. The L-shaped members 24 are resiliently connected to the body by plunger pins 28 which bear in L-shaped bracket members 29 secured to the side walls of the body adjacent the front end thereof at a position which aligns vertically with the axis of the shaft 15 when the truck body is in a normal load carrying position. Resilient means preferably in the form of rubber plugs 30 are disposed between the upper ends 28$^a$ of the plungers 28 and the horizontal extensions of the brackets 29, whereby when the dumping mechanism is in a lowered position, the plugs 30 may be compressed and this compressing action of the plugs 30 serves to maintain the body in a forced resting position on the members 13.

To maintain the plug in the compressed condition shown in Fig. 2, when the crank arm 15$^a$ is released by the operator, the links 21 are of such form as to be offset to permit the swinging of the arms 20 to bring the connecting pins 22 beyond a vertical plane extending through the axis of the shaft 15 and the pins 25, and this offset may be such that the links 21 will contact with the shaft and thus prevent a further backward swinging than that shown by the dot and dash lines in Fig. 3. As shown, in the full lines in Fig. 3, the members 24 will contact with the bottom faces of the brackets 29 mounted on the dump body as soon as the shaft 15 is turned to bring the link arm 20, in a counterclockwise direction as viewed in Fig.

3, into the vertical plane referred to and a further swinging of the shaft in this direction will cause the link members to tilt the body about the pivot 12 as shown by the dot and dash position in Fig. 1.

In Fig. 4 a modified arrangement is disclosed wherein the parts are substantially identical but the bracket members 29 are secured to the rear wall of the dump body immediately adjacent the corners thereof and links 21 are attached thereto in the manner described.

In all the forms of link mechanism shown, the links 20 may be provided with upset portions in the form of stop lugs 31 which contact with the edges of the link arms 20 to limit the upward swinging movement of the links in a well known manner.

In Figs. 5 to 8, I show various ways of incorporating a resilient means in the dumping mechanism which may be utilized as a substitute for the rubber plugs 30. In Fig. 5, I provide brackets 29$^a$ which may be formed of resilient material such as flat spring steel. These brackets may be provided with a spring loop 40, having a horizontally extending portion 41 to which the link pivot members 24 may be secured by any suitable means such as bolts 42. The other elements embodied in this form of dumping mechanism are identical with the elements hereinbefore described and are correspondingly numbered.

In Fig. 6, the resiliency is provided in the mechanism by forming the links which connect the body to the shaft or link arms 20, of spring metal. Thus link members 21$^a$ may be formed of spring steel having loop portions 46, which will permit relative displacement of the link ends and allow the overswinging of the shaft 15 as hereinbefore described.

In Fig. 7, I show still another manner of providing resiliency in the mechanism which may comprise flat spring members 50 secured to the side walls, but adjacent the bottom of the dump body with the upper ends free. Suitable means, such as members 51 secure the lower ends of the spring members to the dump body. To these spring members, I may secure the bracket members 29, instead of securing the bracket members direct to the body as hereinbefore described. The upper ends of the spring members 50 are free to move and slide on the side walls of the dump body and pass through brackets or retaining clips 52 as shown in Fig. 8. It will be apparent that part of the dump body side walls could be formed of thin metal whereby the brackets 29 could be slightly displaced relative to their normal positions.

From the foregoing description of my invention, it will be seen that a dump mechanism is provided of a very simple and economical form which is efficient for tilting bodies of light load capacity and will also serve to lock the body in a normal load carrying position, when the dump mechanism is retracted. The mechanism is such that all members thereof are placed under tension and are thus prevented from rattling and consequently the factor of silent operation is assured.

I claim:—

1. In a dumping mechanism of the character described, a shaft mounted on the chassis of a vehicle, a linkage mechanism mounted on the shaft and connected to the dump body of the vehicle and resilient connecting mechanism permanently connecting the body of the vehicle to the link mechanism arranged to restrain the body against movement when such body is in normal position.

2. In a vehicle of the character described, the combination with a dump body pivotally mounted at one end on the chassis of the vehicle of a transverse shaft mounted on the chassis adjacent the other end of the dump body, a pair of arms rigidly mounted on the shaft, a pair of link members pivotally connected to the arms and pivotal connections between the other ends of the link members and walls of the dump body including resilient means permitting an overtravel of the link arms to a definite locking position by a swinging movement of the shaft.

3. In a vehicle of the character described, the combination with a dump body pivotally mounted at one end to the chassis of the vehicle, a transverse shaft mounted on the chassis adjacent the other end of the dump body, a pair of arms rigidly mounted on the shaft, a pair of link members pivotally connected to the free ends of the arms and pivotal connecting means for the other ends of the link members, brackets mounted on the walls of the dump body and resilient means permanently connected to the links to permit an overtravel of the link arms past a dead center position by a swinging movement of the shaft.

4. In a vehicle of the character described, the combination with a dump body pivotally mounted at one end with the chassis of the vehicle, a transverse shaft mounted on the chassis adjacent the other end of the dump body, a crank arm rigidly mounted on the shaft at each side of the body, link members pivotally connected to the arms, said links having offset portions adapted to span the shaft, and a resilient connection between the other ends of the arms and the walls of the dump body including resilient means acting on plungers and means mounted on the body supporting said plungers.

5. In a vehicle of the character described, the combination of a dump body pivotally mounted on the chassis of the vehicle, a transverse shaft mounted on the chassis, a pair of link arms rigidly attached to the shaft adjacent the sides of the body, a pair of links pivotally connected to said arms and to the body, the pivotal centers of said connections for said links being adapted to be brought into vertical alignment with the axis of the shaft and a resilient connection permanently disposed between the upper ends of the links and the link pivots adjacent the body for permitting an overswinging movement past the dead center of the pivotal connections between the links and the link arms.

6. In a vehicle of the character described, the combination of a dump body pivotally mounted on the chassis of the vehicle, a transverse shaft mounted on the chassis, a pair of crank arms rigidly attached to the shaft adjacent the sides of the body, a pair of links having offset portions pivotally connected to said arms, resilient means connecting the free ends of the links to the body, the pivotal centers of said connections for said links being adapted to be brought into vertical alignment with the axis of the shaft and by reason of said resilient connections the shaft is adapted to over travel and bring the offset portions of said links into contact therewith.

In testimony whereof, I hereunto affix my signature.

JAMES M. HOWE.